United States Patent
Chapelet et al.

(10) Patent No.: US 12,516,028 B2
(45) Date of Patent: Jan. 6, 2026

(54) TRIAZINANES POSSESSING THIOSULFONATE END-GROUPS AND METHODS OF MAKING THEM

(71) Applicant: FLEXSYS AMERICA L.P., Akron, OH (US)

(72) Inventors: Judicael Jacques Chapelet, Akron, OH (US); Sepideh Niknezhad, Fairlawn, OH (US)

(73) Assignee: FLEXSYS IP HOLDINGS, LLC, Akron, OH (US)

( * ) Notice: Subject to any disclaimer, the term of this patent is extended or adjusted under 35 U.S.C. 154(b) by 589 days.

(21) Appl. No.: 17/996,847

(22) PCT Filed: Apr. 20, 2021

(86) PCT No.: PCT/US2021/028064
§ 371 (c)(1),
(2) Date: Oct. 21, 2022

(87) PCT Pub. No.: WO2021/216487
PCT Pub. Date: Oct. 28, 2021

(65) Prior Publication Data
US 2023/0174495 A1    Jun. 8, 2023

Related U.S. Application Data

(60) Provisional application No. 63/012,972, filed on Apr. 21, 2020.

(51) Int. Cl.
| | |
|---|---|
| C07D 251/04 | (2006.01) |
| B60C 1/00 | (2006.01) |
| C08K 5/42 | (2006.01) |
| C10L 1/24 | (2006.01) |

(52) U.S. Cl.
CPC .......... C07D 251/04 (2013.01); B60C 1/0025 (2013.01); C08K 5/42 (2013.01); C10L 1/2443 (2013.01)

(58) Field of Classification Search
CPC ...... C07D 251/04; B60C 1/0025; C08K 5/42; C10L 1/2443
See application file for complete search history.

(56) References Cited

U.S. PATENT DOCUMENTS

| | | | |
|---|---|---|---|
| 3,732,192 A | 5/1973 | Arnold | |
| 4,532,080 A | 7/1985 | Delseth et al. | |
| 4,654,271 A | 3/1987 | Mauer et al. | |
| 7,674,861 B1 | 3/2010 | York et al. | |
| 2015/0113858 A1 | 4/2015 | Brewer et al. | |
| 2022/0002256 A1 | 1/2022 | Chapelet et al. | |
| 2022/0298123 A1 | 9/2022 | Chapelet et al. | |

FOREIGN PATENT DOCUMENTS

| | | |
|---|---|---|
| CN | 110156719 A | 8/2019 |
| EP | 0070143 A1 | 1/1983 |
| EP | 0432417 A2 | 6/1991 |
| WO | WO-2010059363 A1 | 5/2010 |

OTHER PUBLICATIONS

International Search Report and Written Opinion for International Application No. PCT/US2020/047861, European Patent Office, Netherlands, mailed on Nov. 20, 2020, 9 pages.
International Search Report and Written Opinion for International Application No. PCT/US2019/057357, European Patent Office, Netherlands, mailed on Jan. 20, 2020, 8 pages.
International Search Report and Written Opinion for International Application No. PCT/US2021028064, European Patent Office, Netherlands, mailed on Jun. 9, 2021, 9 pages.

*Primary Examiner* — Alicia L Otton
(74) *Attorney, Agent, or Firm* — Sterne, Kessler, Goldstein & Fox P.L.L.C

(57) ABSTRACT

The present invention is directed to compounds represented by the formula (I): wherein $R_1$ comprises a hydrogen atom or an alkyl group having 1 to 2 carbon atoms, wherein $R_2$ comprises an alkylene group, an arylene group, or a heterocyclic group. The three $R_2$ groups may be the same or different, wherein A comprises an alkyl, an aryl, or an alkylaryl group. The three A groups may be the same or different.

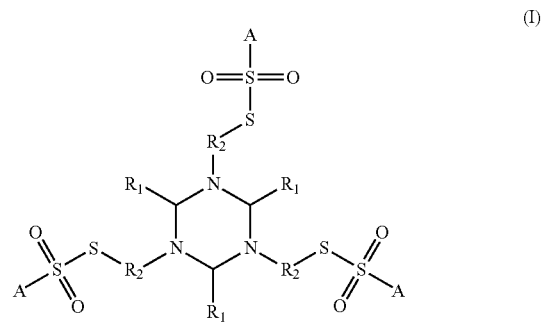

17 Claims, 1 Drawing Sheet

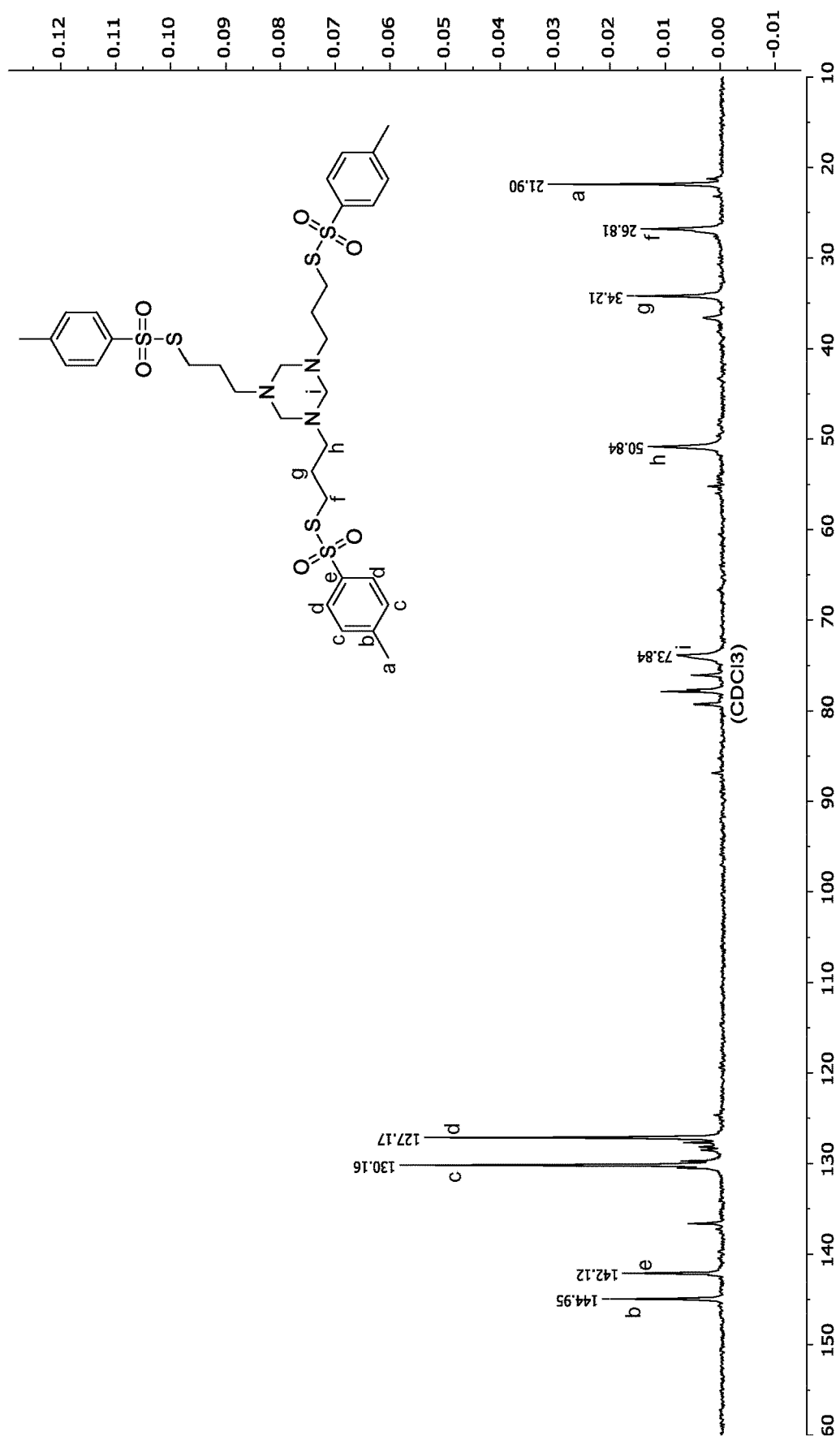

TRIAZINANES POSSESSING THIOSULFONATE END-GROUPS AND METHODS OF MAKING THEM

FIELD OF THE INVENTION

The present invention relates to triazinanes possessing thiosulfonate end-groups and methods of making them. The triazinane compounds of the invention include three thiosulfonate end-groups, making them useful as rubber additives.

BACKGROUND OF THE INVENTION

Processes for vulcanizing diene rubbers by heating with sulfur and a vulcanization accelerator have been known for many years. By this process, vulcanized rubber compositions can be obtained that have such desirable properties as high tensile strength, resilience, and fatigue resistance. However, these compositions may lack desirable aging properties. Apart from the addition of antioxidants, which may retard oxidative heat aging, other methods which have been proposed include the use of lower proportions of sulfur and increased proportions of accelerator relative to those which would be employed for a conventional cure, and the partial or complete replacement of sulfur by other cross-linking agents.

Lowering the ratio of sulfur to accelerator or replacing the sulfur partially or completely by an amine disulfide, can give vulcanizates having inferior dynamic properties. And the use of bis(sulfenamides) and compounds containing two or more accelerator groupings means that molecular species having accelerator activity as well as those having cross-linking activity are released into the vulcanizing system, so that the freedom for variations in compounding, which is possible when the cross-linking agent and the accelerator are added as separate entities, is lost.

European patent No. EP 0 070 143, filed Jul. 7, 1982, relates to organic thiosulfate and thiosulfonate compounds useful as stabilizing agents for rubber vulcanizates. For example, hexamethylene-1,6-bis(thiosulfate) disodium salt, dihydrate available as Duralink HTS from Eastman Chemical Company, Kingsport, TN, is used in sulfur-based vulcanization systems to generate hybrid crosslinks. These crosslinks provide increased retention of physical and dynamic properties when exposed to anaerobic conditions at elevated temperatures, such as those that may occur during overcure, when using high curing temperatures, or during product service life.

U.S. Pat. Appln. No. 62/753,949, filed Nov. 1, 2018, relates to triazinane compounds possessing three thiosulfate end-groups and methods of making them. These compounds are in the manufacture of vulcanized elastomeric articles. Tridentate molecules possessing 3 rubber reactive end-groups can potentially crosslink with 3 rubber chains upon vulcanization.

It is therefore desirable to seek and develop new molecules bearing 3 rubber-reactive end-groups that may be even more compatible than ionic thiosulfate with the apolar rubber matrix. Consequently, the present invention relates to triazinanes having 3 neutral (apolar) thiosulfonate end-groups making them useful as crosslinking agents.

SUMMARY OF THE INVENTION

In a first aspect, the present invention is directed to compounds represented by the formula I:

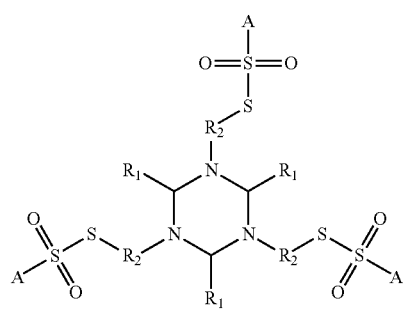

wherein $R_1$ comprises a hydrogen atom or an alkyl group having 1 to 2 carbon atoms;
wherein $R_2$ comprises an alkylene group, an arylene group, or a heterocyclic group; wherein the three $R_2$ groups may be the same or different; and
wherein A comprises an alkyl, an aryl, or an alkylaryl group, wherein the three A groups may be the same or different.

In a second aspect, the present invention relates to methods of making the compounds of formula I, that comprise:
reacting a sulfide salt with an alkylarenesulfonyl halide to form an alkylarenethiosulfonate salt;
reacting the alkylarenethiosulfonate salt with a haloalkylamine hydrohalide to obtain an S-(aminoalkyl) alkylarenethiosulfonate hydrohalide;
deprotonating the S-(aminoalkyl) alkylarenethiosulfonate hydrohalide to obtain an S-(aminoalkyl) alkylarenethiosulfonate; and
reacting the S-(aminoalkyl) alkylarenethiosulfonate with an aldehyde to obtain the compound of formula 1.

In a further aspect, the present invention is directed to compositions that comprise the compounds of formula I, for example vulcanizable elastomeric formulations, as well as articles made from them.

Further aspects of the invention are as set out below and in the claims that follow. It should be understood that the description and specific examples are intended for purposes of illustration only and are not intended to limit the spirit and scope of the present invention.

BRIEF DESCRIPTION OF THE DRAWING

FIG. 1 is a carbon 13 NMR spectrum of a chemical species of the invention.

DETAILED DESCRIPTION

As utilized herein, the following terms or phrases are defined as follows:

"Adhesion promoter" means a material that increases the adhesion of a polymer composition such as a rubber composition to another material.

"Antidegradant" refers to a material that inhibits degradation (as caused by for example, through heat, light, oxidation, and/or ozonation), or manifestations thereof, of a composition, formulation or article to which it is added or applied.

"Antifatigue agent" refers to a material that improves the flex fatigue resistance of a composition, formulation or article to which it is added or applied after a period of in-service application time whereby the composition, formulation or article is subjected to thermal, oxidative, ozone and mechanical degradative forces.

"Antioxidant" refers to a material that inhibits oxidative degradation of a composition, formulation or article to which it is added or applied.

"Antiozonant" refers to a material that inhibits ozone exposure degradation of a composition, formulation or article to which it is added or applied.

"Elastomer" means any polymer which after vulcanization (or crosslinking) and at room temperature can be stretched under low stress, for example to at least twice its original length and, upon immediate release of the stress, will return with force to approximately its original length, including without limitation rubber.

"Vulcanizable Elastomeric Formulation" means a composition that includes an elastomer and that is capable of vulcanization when placed under vulcanization conditions.

The compounds of the present invention are advantageously believed to increase the density of the cross-linked network of rubber compositions, as evidenced by improved reversion properties.

In one aspect, the present invention is directed to compounds that are triazinane derivatives represented by the formula I:

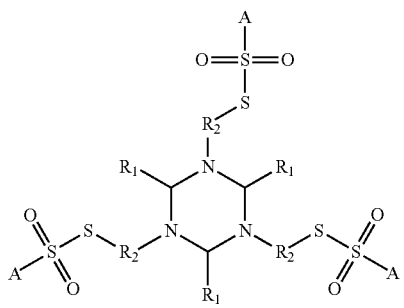

I wherein $R_1$ comprises a hydrogen atom or an alkyl group having 1 to 2 carbon atoms.

wherein $R_2$ comprises an alkylene group, an arylene group, or a heterocyclic group. The three $R_2$ groups may be the same or different.

wherein A comprises an alkyl, an aryl, or an alkylaryl group. The three A groups may be the same or different.

Thus, the present invention relates to molecules bearing three thiosulfonate end-groups, linked to a triazinane core via the $R_2$ group as described above. Without wishing to be bound by any theory, these molecules are believed to exhibit hybrid-crosslinking properties. During processing of rubber, splitting of the $O_2S$—S bond is expected to generate a tri-thiyl radical or a tri-thiolate anion, or a tri-thiol moiety. These species can react upon vulcanization with sulfur and up to three rubber chains to form flexible crosslinks.

According to the invention, $R_1$ of formulas I may comprise a hydrogen atom or an alkyl group having 1 to 2 carbon atoms. Alkyl groups useful according to the invention thus include methyl and ethyl.

According to the invention, $R_2$ may comprise an alkylene group, an arylene group, or a heterocyclic group. Alkylene groups useful according to the invention include methylene, ethylene, propylene, and butylene, and more generally may be straight chain or branched alkylene groups having from 1 to 12 carbon atoms, or from 1 to 8 carbon atoms, or from 2 to 5 carbon atoms. Arylene groups useful according to the invention include phenylene, biphenylene, naphthalene, anthracene, indane, and fluorene, and may be substituted or unsubstituted. More generally, arylene groups include any arylene groups having from 5-18 carbon atoms, or from 6 to 12 carbon atoms, or from 6 to 8 carbon atoms, and may be substituted or unsubstituted. Heterocyclic groups that are useful according to the invention include both saturated and unsaturated heterocycles having from 5 to 12 carbon atoms, and aromatic heterocycles, and include indole, benzofuran, benzothiophene, carbazole, benzothiazole, and benzoxazole.

According to the invention, A may comprise an alkyl group, an aryl group, or an alkylaryl group. Alkyl groups useful according to the invention include methyl, ethyl, propyl, butyl, isopropyl, isobutyl, tertbutyl and more generally may be straight chain or branched alkyl groups having from 1 to 12 carbon atoms, or from 1 to 8 carbon atoms, or from 1 to 4 carbon atoms. Aryl groups useful according to the invention include phenyl, biphenyl, triphenyl, indanyl, fluorenyl, naphthyl, anthracenyl, phenanthrenyl, methoxyphenyl, (methylthio)phenyl, (dimethylamino)phenyl, pyridinyl, diazinyl, triazinyl, quinolinyl, quinoxalinyl, acridinyl, phenazinyl, phenanthridinyl and more generally may be any aromatic groups having from 5 to 18 carbon atoms, or from 6 to 12 carbon atoms, or from 6 to 8 carbon atoms, and may be substituted or unsubstituted. Alkylaryl groups useful according to the invention may be straight, branched, saturated, unsaturated, cyclic, acyclic, or any possible combination, and also include any combination of the alkyl and aryl groups aforementioned with no limitations in terms of possible isomerism.

Compounds of the invention thus include S,S',S"-((1,3,5-triazinane-1,3,5-triyl)tris(propane-3,1-diyl)) tris(4-methylbenzenesulfono-thioate); S,S',S"-((1,3,5-triazinane-1,3,5-triyl)tris(propane-3,1-diyl)) tribenzene-sulfonothioate; S,S',S"-((1,3,5-triazinane-1,3,5-triyl)tris(propane-3,1-diyl)) trimethanesulfonothioate; S,S',S"-((1,3,5-triazinane-1,3,5-triyl)tris(propane-3,1-diyl)) triethanesulfonothioate; S,S',S"-((1,3,5-triazinane-1,3,5-triyl)tris(propane-3,1-diyl)) tripropanesulfonothioate; S,S',S"-((1,3,5-triazinane-1,3,5-triyl)tris(propane-3,1-diyl)) triisopropanesulfonothioate; S,S',S"-((1,3,5-triazinane-1,3,5-triyl)tris(propane-3,1-diyl)) tributanesulfonothioate; S,S',S"-((1,3,5-triazinane-1,3,5-triyl)tris(propane-3,1-diyl)) triisobutanesulfonothioate; S,S',S"-((1,3,5-triazinane-1,3,5-triyl)tris(propane-3,1-diyl)) tritert-butanesulfonothioate; S,S',S"-((1,3,5-triazinane-1,3,5-triyl)tris(propane-3,1-diyl)) tris(naphthalene-2-sulfonothioate); and S,S',S"-((1,3,5-triazinane-1,3,5-triyl) tris(propane-3,1-diyl)) tris(naphthalene-1-sulfonothioate); S,S',S"-((1,3,5-triazinane-1,3,5-triyl)tris(propane-3,1-diyl)) tris(2-methoxybenzenesulfonothioate); S,S',S"-((1,3,5-triazinane-1,3,5-triyl)tris(propane-3,1-diyl)) tris(3-methoxybenzenesulfonothioate); and S,S',S"-((1,3,5-triazinane-1,3, 5-triyl)tris(propane-3,1-diyl)) tris(4-methoxybenzenesulfonothioate).

In another aspect, the invention relates to methods of making the compounds represented by formula I:

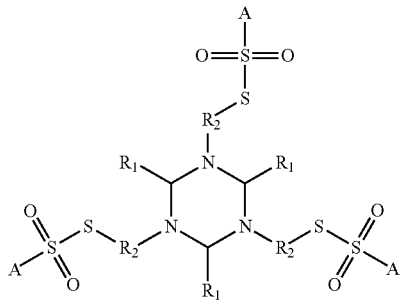

Wherein $R_1$ comprises a hydrogen atom or an alkyl group having 1 to 2 carbon atoms.

Wherein $R_2$ comprises an alkylene group, an arylene group, or a heterocyclic group. The three $R_2$ groups may be the same or different.

Wherein A comprises an alkyl, an aryl, or an alkylaryl group. The three A groups may be the same or different.

According to this aspect, the compounds according to the invention may be produced by reacting a sulfide salt with an alkylarenesulfonyl halide to form an alkylarenethiosulfonate salt, for example sodium para-tolylthiosulfonate. The sulfide anion in sodium para-tolylthiosulfonate may nucleophilically react with the carbon alpha to the halogen atom in a haloalkylamine hydrohalide to form a S-(aminoalkyl) para-tolylthiosulfonate hydrohalide, for example S-(3-aminopropyl) para-tolylthiosulfonate hydrochloride. The ammonium halide group (amine hydrochloride) of the S-(3-aminopropyl) para-tolylthiosulfonate hydrochloride obtained may be reacted or deprotonated, for example with sodium hydroxide, to obtain the free base S-(3-aminopropyl) para-tolylthiosulfonate. The free base S-(3-aminopropyl) para-tolylthiosulfonate is typically not isolated as it is unstable, and its amine moiety is directly condensed with an aldehyde, for example formaldehyde, to obtain the desired triazinanes of formula I.

The sulfide salts useful according to the invention may correspond, for example, to the compounds of formula II:

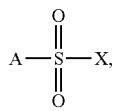 II, wherein the two M cations may be identical or different and may be an alkali metal cation, the proton cation, or an ammonium or alkyl ammonium cation derived by addition of one or more protons to a nitrogenous base. We have found sodium sulfide

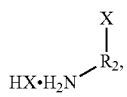

to be a suitable sulfide salt. We have thus far demonstrated the invention with the use of sodium sulfide nonahydrate. However, other suitable sulfide salt sources may be used, such as lithium sulfide, potassium sulfide, lithium hydrosulfide, sodium hydrosulfide, potassium hydrosulfide, in the pure form, hydrated, or in solution in solvent. Such sulfide salts useful according to the invention can be either synthesized or purchased when commercially available.

The alkanesulfonyl halide, arenesulfonyl halide, or alkylarenesulfonyl halide useful according to the invention, may correspond, for example, to the compounds of formula III:

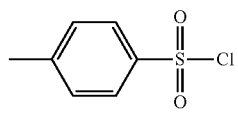 III wherein A was already described hereinbefore with respect to formula I, and X is a halogen atom, for example chlorine, bromine, or iodine. We have found para-toluenesulfonyl chloride

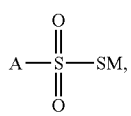

to be a suitable alkylarenesulfonyl halide. Other suitable alkanesulfonyl halides, arenesulfonyl halides, and alkylarenesulfonyl halides include, without limitation, methanesulfonyl chloride, ethanesulfonyl chloride, propanesulfonyl chloride, benzenesulfonyl chloride, phenyl-benzenesulfonyl chloride, methoxybenzenesulfonyl chloride, (methylthio)benzenesulfonyl chloride, naphthalenesulfonyl chloride, anthracenesulfonyl chloride, and phenanthrenesulfonyl chloride. Such alkanesulfonyl halides, arenesulfonyl halides, and alkylarenesulfonyl halides useful according to the invention can be either synthesized or purchased when commercially available.

The alkanethiosulfonate salts, arenethiosulfonate salts, or alkylarenethiosulfonate salts obtained may correspond, for example, to formula IV:

$$A-\overset{O}{\underset{O}{\overset{\|}{S}}}-SM,$$ IV wherein A and M are as already described hereinbefore and with respect to formula I and formula II. Such alkanethiosulfonate salts, arenethiosulfonate salts, and alkylarenethiosulfonate salts useful according to the invention can be either synthesized from molecules of formula II and molecules of formula III or purchased when commercially available.

The haloalkylamine hydrohalides useful according to the invention, may correspond, for example, to the compounds of formula V:

$$HX \cdot H_2N \overset{X}{\underset{}{\overset{|}{\diagdown}}} R_2,$$ V wherein $R_2$ may be an alkylene, arylene, or heterocyclic group, as already described with respect to formula I, that links the halide atom to the nitrogen atom, and X is likewise a halogen, for example chlorine, bromine, or iodine. We have found 3-chloropropylamine hydrochloride

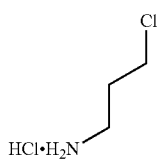

to be a suitable haloalkylamine hydrohalide. Other haloalkylamine hydrohalides include, without limitation, 3-bromopropylamine hydrobromide, 2-chloroethylamine hydrochloride, 2-bromoethylamine hydrobromide, 4-chlorobutylamine hydrochloride, 5-chloropentylamine hydrochloride, and the like.

The S-(aminoalkyl) alkanethiosulfonate hydrohalides, S-(aminoalkyl) arenethiosulfonate hydrohalides, or S-(aminoalkyl) alkylarenethiosulfonate hydrohalides obtained may correspond, for example, to formula VI:

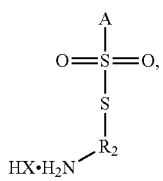

VI wherein A, $R_2$ and X are as already described hereinbefore and with respect to formula I and formula V. Similarly, the S-(aminoalkyl) alkanethiosulfonates, S-(aminoalkyl) arenethiosulfonates, or S-(aminoalkyl) alkylarenethiosulfonates obtained may correspond, for example, to formula VII:

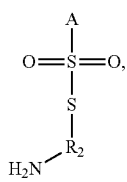

VII wherein A and $R_2$ are likewise as already described.

The S-(aminoalkyl) alkanethiosulfonates, S-(aminoalkyl) arenethiosulfonates, or S-(aminoalkyl) alkylarenethiosulfonates obtained may directly be reacted with an aldehyde, such as formaldehyde, to afford the desired triazinanes of formula I. Suitable aldehydes include those that correspond, for example, with formula VIII:

VIII

Wherein $R_1$ may be a hydrogen atom or an alkyl group having 1 to 2 carbon atoms, that is, methyl or ethyl, as described hereinbefore and with respect to formula I. We have thus far demonstrated the invention with the use of aqueous formaldehyde. However, other suitable formaldehyde sources may be used, such as paraformaldehyde, 1,3,5-trioxane, pure formaldehyde gas, a solution of formaldehyde in solvent, or any combination of the aforementioned.

According to the invention, we thus propose the synthesis and characterization of an organic molecule possessing three thiosulfonate end-groups and a triazinane core.

In another aspect briefly referenced above, the present invention is directed to a composition that includes at least one compound of the present invention as described above. The specific amount of the compound of the present invention that is included in the composition may vary widely depending on the intended application for the composition. It will be understood by one of ordinary skill in the art that the compositions of the present invention can include one or more compounds of the present invention such that the concentration of each individual compound necessary to achieve the desired efficacy is lower. Further, other known additives may be included in the composition such that a reduced amount of the compound of the present invention may be required to achieve the total desired efficacy.

In one embodiment that is exemplified in detail above, the composition of a present invention is a vulcanizable elastomeric formulation. The vulcanizable elastomeric formulation of the present invention includes at least one elastomer and the compounds of the present invention. Preferably, the compounds of the present invention are present in the vulcanizable elastomeric formulation in an amount of from 0.1 to 30 parts, preferably from 0.1 to 5.0 parts, per 100 parts elastomer.

The elastomer in the vulcanizable elastomeric formulation may be any vulcanizable unsaturated hydrocarbon elastomer known to one skilled in the art. These elastomers may include, without limitation, natural rubber or any synthetic rubber, for example diene-containing elastomers such as polymers formed from butadiene; isoprene; or combinations of styrene and butadiene, or styrene and isoprene, or styrene, butadiene and isoprene; or polymers formed from ethylene, propylene and diene monomers such as ethylidene norbornadiene or 1,5-hexadiene; or polymers formed from combinations of isobutylene, isoprene, and para-methyl-styrene. The latter potentially could be further halogenated with bromine or chlorine to further extend its usefulness in co-vulcanization with general purpose rubbers such as natural rubber and styrene-butadiene rubber. The vulcanizable elastomeric formulation may optionally also include other additives conventionally used in rubber processing, such as processing/flow aids, extenders, plasticizers, resins, adhesion promoters, antidegradants, coupling agents such as silanes or other promoters of filler-to-polymer interaction, bonding agents, buffers, fillers, pigments, activators, prevulcanization inhibitors, acid retarders, accelerators, fatty acids, zinc oxide, or other compounding ingredients or additives to further enhance the characteristics and/or improve the performance of the vulcanizable elastomeric formulation or the vulcanized elastomeric article from which it is formed Suitable accelerators may include, but not be limited to guanidines, thiazoles, sulfenamides, sulfenimides, dithiocarbamates, xanthates, thiurams, and combinations or mixtures thereof.

The vulcanizable elastomeric formulation of the present invention is useful in the manufacture of vulcanized elastomeric articles such as rubber belts and hoses, windshield wiper blades, vehicle tires and components thereof such as the tread, shoulder, sidewall and innerliner. Accordingly, in another aspect, the present invention is directed to a vulcanized elastomeric article with at least one component formed from the vulcanizable elastomeric formulation of the present invention. In one particular embodiment, the vulcanized elastomeric article is a vehicle tire, and the tire component is a sidewall. Alternatively, the vulcanized elastomeric article may be a reinforcing or structural tire component such as a belt ply compound or construction, a body ply compound or construction, a cover ply, a gum strip, or a composition such as a bead filler, an apex, a wedge, a chafer, a toe guard, a rim guard, or other high modulus component imparting durability to tire service, especially under repeated flexural stresses which may include high service loads.

While the foregoing aspects of the present invention have described utilities primarily focused on compositions related to vulcanized elastomeric article manufacture, it will be understood that the triazinanes of the present invention may also be useful in compositions for other utilities where thiosulfonate functionality is desired. Accordingly, and as described above, the present invention in a general aspect is directed to a composition including the compounds of the present invention according to formula I and defined elsewhere herein. The compositions of the present invention therefore include the compounds of the present invention and optionally a carrier for the compound. Suitable carriers are substantially inert with respect to the compound and include waxes, oils, or solids such as carbon black or silica.

In a separate embodiment, the triazinanes of the present invention have a separate primary utility or functionality (such as a coating, lubricant, oil, fuel additive or fuel composition) and include a functional ingredient and the triazinanes of the present invention as a component. The functional ingredient is typically a degradable material such as a hydrocarbon but may also include other degradable materials. This embodiment therefore encompasses for example, a lubricant composition that includes a lubricant as the functional ingredient and the compound of the present invention. This embodiment further encompasses a combustible fuel composition that includes a combustible fuel as the functional ingredient and the compound of the present invention. This embodiment further encompasses a fuel additive composition that includes a fuel additive as the functional ingredient and the compound of the present invention.

A person skilled in the art will recognize that the measurements described herein are standard measurements that can be obtained by a variety of different test methods. The test methods described represents only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible, in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

Precursors for compounds of the present invention, the compounds of the present invention and methods for their manufacture are illustrated by the following examples, which are not intended to limit the spirit or scope of the present invention.

Example 1: Preparation of S,S',S''-((1,3,5-triazinane-1,3,5-triyl)tris(propane-3,1-diyl))tris(4-methylbenzenesulfonothioate)

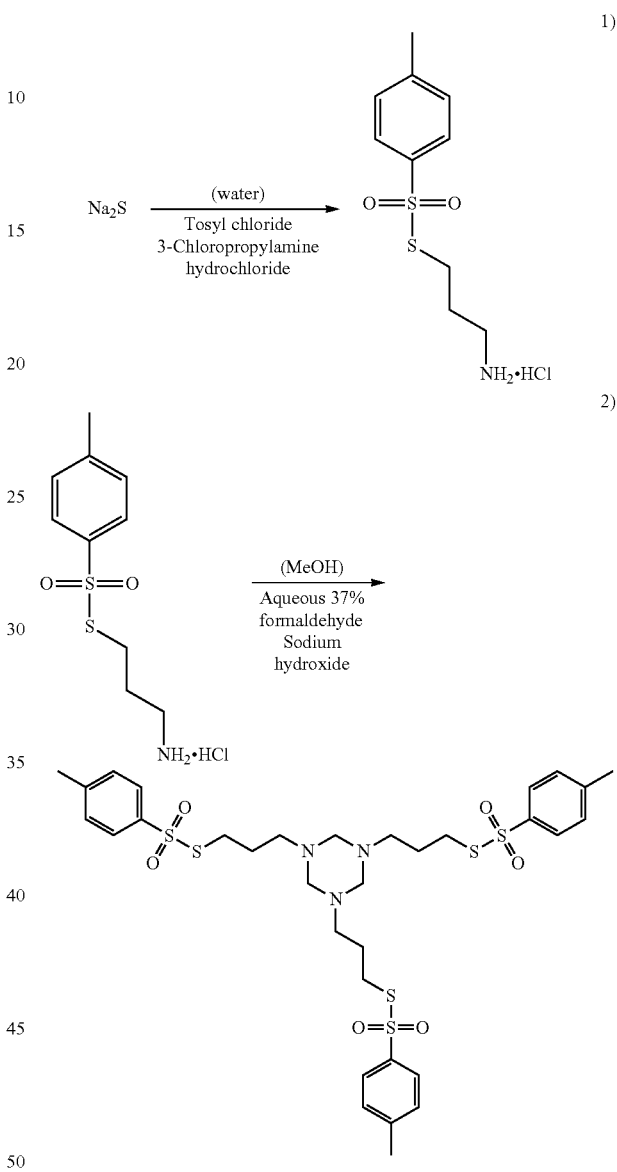

1) 3-Aminopropyl p-toluenethiosulfonate hydrochloride synthesis: To a 100-mL flask fitted with stir-bar, condenser, and thermometer were charged sodium sulfide nonahydrate (17.98 g; 74.86 mmol of sulfide anion) and DI water (24 mL). The mixture was stirred under $N_2$ protection and pre-heated to 30 deg C. (oil bath temperature). When $Na_2S$ was fully dissolved, p-toluenesulfonyl chloride (13.86 g; 72.70 mmol) was added portion-wise in a way the temperature was kept below 41 deg C. (that took 33 mins). The temperature of the oil bath was set to 40 deg C.: The reaction mixture was stirred at 36-40 deg C. for 2 hrs. The temperature of the oil bath was set to 117 deg C. During the increase of temperature, a solution of 3-chloropropylamine hydrochloride (8.98 g; 69.07 mmol) in DI water (9 mL) was added over 1-2 mins. The reaction mixture was stirred and refluxed (99-100 deg C.) for 1.25 hrs, then allowed to cool to room temperature. The mixture was transferred to a separatory funnel and washed with toluene (2×20 mL). The product was extracted with ethyl acetate (2×125 mL). The combined organic layers were washed once with saturated aq. NaCl (120 mL), then stripped of volatiles under reduced pressure (rotary evaporator; water bath=50 deg C.). The resulting syrup was dried on the rotary evaporator (50 deg C.; <15 mbars) for 0.5 hr. Yield=14.43 g (74% of the theoretical based on 3-chloropropylamine hydrochloride) as a very viscous material. This crude material was involved in the following synthesis without further purification.

2) S,S',S''-((1,3,5-triazinane-1,3,5-triyl)tris(propane-3,1-diyl)) tris(4-methylbenzenesulfonothioate) synthesis: To a 250-mL flask fitted with stir-bar were charged the substrate crude 3-aminopropyl p-toluenethiosulfonate hydrochloride (13.48 g containing about 8 wt % residual ethyl acetate; about 44.0 mmol substrate) and methanol (44 mL). The mixture was stirred under $N_2$ protection and temporarily heated with a warm tap water bath to help dissolve the substrate. To the obtained clear solution was added aqueous 37% formaldehyde (3.4 mL; 45.66 mmol HCHO). The flask was chilled with a cold tap water bath. Sodium hydroxide (1.69 g; 42.25 mmol) was added in one portion. A white solid readily separated (NaCl). Once all the NaOH pellets were dissolved (5 mins), the chilling bath was removed. The reaction mixture was stirred without external heating or cooling for 2.75 hrs. DI water (90 mL) was added. The titled compound was extracted with chloroform (2×50 mL). The combined organic phases were washed once with saturated aq. NaCl (60 mL), dried over anhydrous $MgSO_4$, filtered (filter paper), then stripped of volatiles under reduced pressure (rotary evaporator; water bath=60 deg C.). The resulting oil was dried on the rotary evaporator (60 deg C.; <15 mbars) for 3.5 hrs. Yield=7.64 g (67% based on 3-aminopropyl p-toluenethiosulfonate hydrochloride) as a slightly yellow viscous material.

The first step entails the reaction of tosyl chloride with sodium sulfide to form the intermediate sodium p-toluenethiosulfonate. The latter is not isolated and reacted directly with 3-chloropropylamine hydrochloride to produce 3-aminopropyl p-toluenethiosulfonate hydrochloride. The sulfide dianion (in sodium sulfide) has a remarkable property: in some cases, it can react subsequently with two different electrophiles to form unsymmetrical thio compounds. In the present synthesis, the first electrophilic center is the sulfur atom in p-toluenesulfonyl chloride, and the second electron deficient center is the methylene covalently bonded to the chlorine atom in 3-chloropropylamine hydrochloride. The resulting sp3 hybridized sulfur atom in the intermediate product is flanked by a p-toluenesulfonyl moiety and a 3-aminopropyl (hydrochloride) group.

The next step entails the deprotonation of 3-aminopropyl p-toluenethiosulfonate hydrochloride with sodium hydroxide and condensation of the amine intermediate with formaldehyde to generate the triazinane ring. Care should be taken to avoid side-reaction of the free amine with the $sp^3$ hybridized sulfur atom in the thiosulfonate moiety. The by-product generated that way is a polymeric sulfenamide, which was observed in previous experiments as an insoluble amorphous white solid. This issue can be mitigated by charging aqueous formaldehyde prior sodium hydroxide, and employing conditions favoring condensation over nucleophilic substitution pathway. The use of methanol as solvent and relatively mild conditions (reaction conducted at room temperature) did not afford any detectable insoluble white solid.

Analytical data of the final material is shown in the FIGURE.

The invention claimed is:

1. A compound represented by formula I:

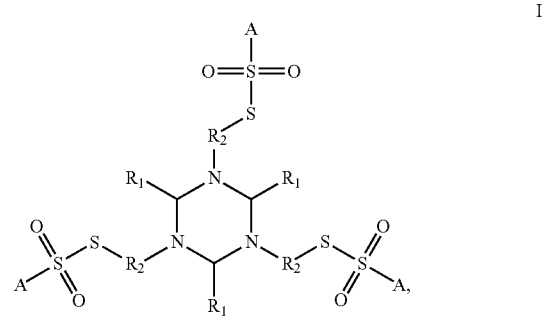

wherein $R_1$ is a hydrogen atom or an alkyl group having 1 to 2 carbon atoms;

wherein $R_2$ is an alkylene group, an arylene group, or a heterocyclic group, wherein the three $R_2$ groups may be the same or different; and wherein A is an alkyl, an aryl, or an alkylaryl group, wherein the three A groups may be the same or different.

2. The compound of claim 1, wherein $R_1$ is a hydrogen atom; wherein $R_2$ is an alkylene group having from 1 to 5 carbon atoms; and wherein A is an alkyl, aryl or alkylaryl group having from 1 to 12 carbon atoms.

3. The compound of claim 1, wherein $R_1$ is a hydrogen atom; wherein $R_2$ is an alkylene group having from 2 to 4 carbon atoms; and wherein A is an alkyl, aryl or alkylaryl group having from 1 to 8 carbon atoms.

4. S,S',S''-((1,3,5-triazinane-1,3,5-triyl)tris(propane-3,1-diyl)) tris(4-methylbenzenesulfonothioate).

5. S,S',S''-((1,3,5-triazinane-1,3,5-triyl)tris(propane-3,1-diyl)) tribenzenesulfonothioate.

6. S,S',S''-((1,3,5-triazinane-1,3,5-triyl)tris(propane-3,1-diyl)) trimethanesulfonothioate.

7. A method of making the compound of claim 1, comprising:

reacting a sulfide salt having formula II:

$SM_2$, wherein each M is independently an alkali metal cation, a proton cation, an ammonium cation, or an alkyl ammonium cation, with an alkylarenesulfonyl halide having formula III:

wherein A is an alkylarene group and X is a halogen atom, to form an alkylarenethiosulfonate salt having formula IV:

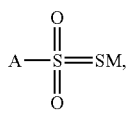

reacting the alkylarenethiosulfonate salt having formula IV with a haloalkylamine hydrohalide having formula V:

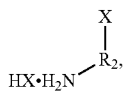

wherein $R_2$ is an alkylene group, an arylene group, or a heterocyclic group; and X is a halogen atom,
to obtain an S-(aminoalkyl) alkylarenethiosulfonate hydrohalide having formula VI:

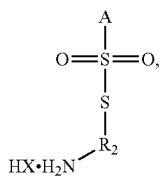

deprotonating the S-(aminoalkyl) alkylarenethiosulfonate hydrohalide to obtain an S-(aminoalkyl) alkylarenethiosulfonate having formula VII:

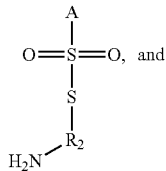

reacting the S-(aminoalkyl) alkylarenethiosulfonate having formula VII with an aldehyde having formula VIII:

wherein $R^1$ is a hydrogen atom or an alkyl group having 1 to 2 carbon atoms,
to obtain the compound of claim 1.

8. The method of claim 7, wherein the sulfide salt is sodium sulfide, the alkylarenesulfonyl halide is para-toluenesulfonyl chloride, the haloalkylamine hydrohalide is 3-chloropropylamine hydrochloride, and the aldehyde is formaldehyde.

9. A stabilizer composition comprising the compound of claim 1 and optionally a carrier for said compound.

10. A vulcanizable elastomeric formulation comprising an elastomer and the compound of claim 1.

11. The formulation of claim 10 wherein said the compound is present in an amount of from 0.01 to 30 parts per 100 parts of elastomer.

12. The formulation of claim 11 wherein said the compound is present in an amount of from 0.1 to 5.0 parts per 100 parts of elastomer.

13. A vulcanized elastomeric article formed from the vulcanizable elastomeric formulation of claim 10.

14. The vulcanized elastomeric article of claim 13 wherein said vulcanized elastomeric article is a component of a vehicle tire.

15. The vulcanized elastomeric article of claim 14 wherein said component is a sidewall.

16. A combustible fuel composition comprising a combustible fuel and the compound of claim 1.

17. A fuel additive composition comprising a fuel additive and the compound of claim 1.

\* \* \* \* \*